United States Patent [19]

Vargiu et al.

[11] 3,860,561
[45] Jan. 14, 1975

[54] PROCESS FOR THE PRODUCTION OF EPOXY-NOVOLAK RESINS AND PRODUCTS THEREOF

[75] Inventors: Silvio Vargiu; Sesto S. Giovanni; Mario Pitzalis, all of Milan; Giancarlo Crespolini, Bergamo, all of Italy

[73] Assignee: Societa 'Italiana Resine S.I.R. S.p.A., Milan, Italy

[22] Filed: Aug. 9, 1973

[21] Appl. No.: 387,227

[30] Foreign Application Priority Data

Sept. 20, 1972 Italy .................................. 29425/72

[52] U.S. Cl. .... 260/59 EP, 117/124 E, 117/132 BE, 117/132 BF, 260/32.8 EP, 260/33.2 EP, 260/38, 260/51 EP, 260/830 P, 260/841, 260/857 R

[51] Int. Cl. .............................................. C08g 5/18

[58] Field of Search .................... 260/51 EP, 59 EP

[56] References Cited
UNITED STATES PATENTS

| | | | |
|---|---|---|---|
| 3,396,145 | 8/1968 | Gruenwald | 260/47 |
| 3,492,269 | 1/1970 | Jassen et al. | 260/47 |
| 3,632,836 | 1/1972 | Walker | 260/830 |

*Primary Examiner*—Lester L. Lee
*Attorney, Agent, or Firm*—Sughrue, Rothwell, Mion, Zinn & Macpeak

[57] ABSTRACT

Process for the production of solid epoxy-novolak resins having a high content of epoxy groups by adding an inorganic base, preferably sodium hydroxide, in a quantity of about 2 to 10 wt. % of total quantity of base to be used to a fused novolak phenolic resin having an average molecular weight of about 500 to 650 and containing about 5 to 6 phenolic hydroxyl groups per molecule at about 80° to 100°C, the total quantity of base to be used corresponding to about 0.9 to 1.1 equivalents of base per mole equivalent of phenolic hydroxyl groups in the novolak phenolic resin, adding a epihalohydrin to the reaction mixture obtained in the course of at least about 2 hours at temperatures of about 80° to 100°C in a quantity of about 3 to 6 moles per mole equivalent of phenolic hydroxyl groups in the novolak phenolic resin, adding the remainder of the inorganic base to the reaction mixture obtained in the course of at least about 3 hours at temperatures of about 85° to 110°C, and separating the solid epoxy-novolak resin from the reaction mixture obtained.

6 Claims, No Drawings

PROCESS FOR THE PRODUCTION OF EPOXY-NOVOLAK RESINS AND PRODUCTS THEREOF

The invention relates to a process for the production of epoxy-novolak resins having improved properties. In particular, the invention relates to a process for the production of solid epoxy-novolak resins having a high content of epoxy groups, which are suitable for the production of coating compositions, adhesives, casting resins, laminated materials, and moulding compositions.

The reaction of novolak phenolic resins with compounds that introduce epoxy groups, e.g., epihalohydrins, such as epichlorohydrin or 3-chloro-1,2-epoxybutane, in the presence of a hydrogen halide acceptor, e.g., an inorganic base, is known.

Epoxy-novolak resins, i.e., epoxy resins of higher functionality, are obtained as products; cf. Methoden der Organischen Chemie (Houben-Weyl), 4th edition, vol. XIV/2 (1963), pages 472 to 473. These epoxy resins can be converted into highmolecular products with curing agents. Substances that may be used as curing agents are compounds that can react with epoxy groups, such as amines, anhydrides of dicarboxylic acids, or polyamides; cf. Methoden der Organischen Chemie (Houben-Weyl), 4th edition, vol. XVI/2 (1963), pages 499 to 532.

On introduction of compounds containing epoxy groups or yielding epoxy groups into novolak phenolic resins, particularly into novolak resins having a high content of phenolic hydroxyl groups, it is difficult to achieve complete or substantially complete etherification of the phenolic hydroxyl groups and conversion into epoxy-containing groups. In the known methods for the conversion of phenolic hydroxyl groups into epoxy-containing groups, therefore, the compound that introduces the epoxy groups is used in excess and under vigorous reaction conditions, particularly with regard to reaction time and reaction temperature. However, this procedure does not lead to entirely satisfactory results. For example, the use of high temperatures for long times is disadvantageous, since side reactions leading to an increase in the molecular weight and to crosslinking reactions occur. Side reactions are promoted by the considerable content of phenolic hydroxyl groups, and ultimately lead to gelation of the reaction mixture.

The purpose of the invention is therefore to provide a simple and economical process for the production of solid epoxy-novolak resins characterized by a high content of epoxy groups and a low content of phenolic hydroxyl groups.

The object of the invention is thus a process for the production of solid epoxy-novolak resins by reaction of novolak phenolic resins with an epihalohydrin in the presence of an inorganic base, characterized in that a. the inorganic base is added in a quantity of about 2 to 10 wt.% of the total quantity of base to be used to a fused novolak phenolic resin having an average molecular weight of about 500 to 650 and containing about 5 to 6 phenolic hydroxyl groups per molecule at about 80° to 100°C, the total quantity of base to be used corresponding to about 0.9 to 1.1 equivalents of base per mole equivalent of phenolic hydroxyl groups in the novolak phenolic resin, b. the epihalohydrin is added to the reaction mixture obtained in accordance with (a) in the course of at least about 2 hours at temperatures of about 80° to 100°C in a quantity of about 3 to 6 moles per mole equivalent of phenolic hydroxyl groups in the novolak phenolic resin, c. the remainder of the inorganic base is added to the reaction mixture obtained in accordance with (b) in the course of at least about 3 hours at temperatures of about 85° to 100°C, and d. the solid epoxy-novolak resin is separated from the reaction mixture obtained in accordance with (c).

The process of the invention differs from the known processes for the production of epoxy-novolak resins in that the inorganic base acting as the hydrogen halide acceptor is added to the novolak phenolic resin in measured quantities and in two separate steps.

A water soluble alkali metal or alkaline earth metal hydroxide, oxide, or carbonate may be used as the inorganic base. Sodium hydroxide is preferably used. The inorganic base is preferably used in the form of an aqueous solution. The concentration of the inorganic base in the aqueous solution is not particularly critical. Good results are obtained with an about 50 wt.% sodium hydroxide solution. Potassium hydroxide may also be used, but it is more expensive.

Any common halohydrin may be used as the epihalohydrin. Epichlorohydrin is particularly preferred.

It has been found that the phenolic hydroxyl groups of the novolak phenolic resin can be practically completely etherified and converted into epoxy-novolak resins without side reactions by the process of the invention under the following conditions.

The novolak phenolic resins used as the starting material are prepared in a known manner by condensation of phenol with formaldehyde in a molar ratio of about 1.18:1 to 1.3:1 in the presence of an inorganic or organic acid, such as hydrochloric acid, formic acid, salicylic acid, oxalic acid, acetic acid, or phosphoric acid, as a catalyst; cf. Methoden der Organischen Chemie (Houben-Weyl), 4th edition, vol. XIV/2 (1963), pages 201 to 209. The molecular weight of the novolak phenolic resins used in the process of the invention is about 500 to 650; preferably about 600 to 650. They preferably have a melting point or melting range of about 60° to 70°C.

The introduction of the epoxy groups into the novolak phenolic resins by the process of the invention is carried out at a temperature above the melting point of novolak phenolic resin with an excess of epihalohydrin and in the presence of the inorganic base as a hydrogen halide acceptor. The inorganic base is added in measured quantities in two separate steps of the process. The epihalohydrin used is preferably epichlorohydrin. The molar ratio of epihalohydrin per mole equivalent of phenolic hydroxyl groups in the novolak phenolic resin is about 3:1 to 6:1, preferably about 5 : 1.

In the process of the invention, the novolak phenolic resin is first allowed to react with part of the inorganic base, this part being at most about 10 percent, preferably about 3 to 6 percent, of the total quantity of base to be used. On the other hand, it is not advisable to use less than about 2 percent, since the characteristic advantages of the process of the invention cannot then be obtained. This step of the process is carried out above the melting point of the novolak resin, preferably at about 80° to 100°C.

The compound for the introduction of epoxy groups, preferably epichlorohydrin, is added to the reaction mixture treated as described above in the course of at least about 2 hours with stirring, a temperature of about 80° to 100°C being maintained. The quantity of epichlorohydrin used is preferably within the range indicated above. About 5 moles of epichlorohydrin per mole equivalent of phenolic hydroxyl groups in the novolak phenolic resin are preferably used.

The remainder of the inorganic base is finally added to the reaction mixture in portions in the course of at least about 3 hours. The inorganic base is added in a quantity such that the total quantity is about 0.9 to 1.1 mole of inorganic base per mole equivalent of phenolic hydroxyl groups in the novolak phenolic resin. The preferred inorganic base for use in this step is again sodium hydroxide, which is preferably added continuously to the reaction mixture in the form of an aqueous solution. The reaction in this step is carried out at temperatures of about 85° to 110°C. The reaction mixture is heated to boiling point, and water is distilled out of the reaction mixture together with the epihalohydrin, with which it forms an azeotropic mixture.

After the complete addition of the inorganic base to the reaction mixture, the above reaction conditions are maintained for about further 30 to 60 minutes. At the same time, the unreacted epihalohydrin is distilled off under reduced pressure and with a temperature of at most about 150°C in the reaction vessel. The reaction product is finally cooled. The epoxy-novolak resin obtained is preferably dissolved in an inorganic solvent. Particularly preferred solvents for this purpose are methyl isobutyl ketone and diethylene glycol monobutyl ether. The resulting solution of the epoxy-novolak resin is then washed with water to remove inorganic halide salts, which are by-products of the process. The organic phase is separated, dried, filtered, and evaporated to remove the solvent.

Treatment under the conditions indicated above yields clearly transparent, solid epoxy-novolak resins having the following typical properties:

| | |
|---|---|
| Colour (Gardner number) | 2 to 3 |
| Melting point | 50 to 60°C |
| Average molecular weight | 820 to 870 |
| Epoxy equivalent weight | 230 to 250 |
| Viscosity | 140 to 170 cP (measured at 25°C in 40% diethylene glycol monobutyl ether solution) |

The epoxy-novolak resins prepared by the process of the invention are very readily soluble in organic solvents.

The invention is further illustrated by the following non-limiting Examples. The viscosity of the epoxy-novolak resins obtained is measured at 25°C in a 40 wt.% solution in diethylene glycol monobutyl ether.

EXAMPLE 1

A flask fitted with a stirrer, reflux condenser, thermometer, and gas inlet tube for an inert gas is charged with 500 parts by weight of a novolak phenolic resin having the following properties:

| | |
|---|---|
| Average molecular weight | 620 |
| Melting point | 65 to 70°C |
| Average number of hydroxyl groups per molecule | 6 |

The novolak phenolic resin is obtained in a known manner by condensation of phenol and formaldehyde in a molar ratio of 1.2:1 in the presence of oxalic acid as a catalyst.

The novolak phenolic resin is melted and heated to 100°C. In the course of about 5 minutes, 11.2 parts by weight of a 50 percent aqueous solution of sodium hydroxide are added to the melt with stirring. 2,200 parts by weight of epichlorohydrin are then added to the reaction mixture in the course of about 2 hours with maintenance of a temperature of 95° to 98°C. 340 g of a 50 percent aqueous sodium hydroxide solution are finally added to the reaction mixture in the course of about 3 hours with maintenance of a temperature of 95° to 100°C. At the same time, an azeotropic mixture of water and epichlorohydrin is continuously distilled out of the reaction mixture. When the addition of the sodium hydroxide solution is complete, the unreacted epichlorohydrin is distilled off under reduced pressure and at a temperature of at most 150°C in the flask. 700 parts by weight of methyl isobutyl ketone and 320 parts by weight of water are added to the resulting reaction product and thoroughly mixed. The mixing and decantation are carried out at a temperature of about 80°C. The organic phase is separated from the aqueous phase while still hot and filtered, and the solvent is distilled off under reduced pressure up to an internal temperature of 160°C. 680 parts by weight of epoxy-novolak resin having the following properties are obtained:

| | |
|---|---|
| Melting point | 50 to 54°C |
| Epoxy equivalent weight | 230 |
| Viscosity | 150 cP |
| Colour (Gardner number) | 2 to 3 |

For comparison, the flask used in Example 1 is charged with 730 parts by weight of the novolak phenolic resin described in Example 1. The resin is melted, heated to 100°C, and mixed with 94 parts by weight of a 50 percent aqueous sodium hydroxide solution and 3,240 parts by weight of epichlorohydrin. 420 parts by weight of a 50 percent aqueous sodium hydroxide solution are then added to the reaction mixture. The times and temperatures indicated in Example 1 are used for the additions. Excess epichlorohydrin is distilled out of the resulting reaction mixture under reduced pressure up to an internal temperature of 150°C. The residue is mixed with 1,040 parts by weight of methyl isobutyl ketone and 470 parts by weight of water. The phases are then separated by decantation at 80°C. The organic phase is filtered and the methyl isobutyl ketone is distilled off. 750 parts by weight of epoxy-novolak resin having the following properties are obtained:

| | |
|---|---|
| Melting point | 56 to 60°C |
| Epoxy equivalent weight | 330 |
| Viscosity | 400 cP |

EXAMPLE 2

The flask used in Example 1 is charged with 400 parts by weight of the novolak phenolic resin described in Example 1. The resin is melted, heated to 100°C, and mixed with 19 parts by weight of a 50 percent aqueous sodium hydroxide solution, 1,760 parts by weight of epichlorohydrin, and finally 260 parts by weight of 50 percent aqueous sodium hydroxide solution. The times and temperatures indicated in Example 1 are used for the additions. After removal of excess epichlorohydrin by distillation, the reaction mixture is mixed with 580 parts by weight of methyl isobutyl ketone and 250 parts by weight of water. The organic phase is separated and filtered, and the solvent is distilled off under reduced pressure under the conditions indicated in Example 1. An epoxy-novolak resin is obtained as a clearly transparent, solid product having the following properties:

| | |
|---|---|
| Melting point | 55 to 60°C |
| Epoxy equivalent weight | 250 |
| Viscosity | 170 cP |

The epoxy-novolak resins prepared in accordance with Examples 1 and 2 can be cured with the aid of conventional curing agents.

100 parts by weight of the epoxy-novolak resin are melted, heated to 120°C, and homogeneously mixed with 70 parts by weight of phthalic anhydride. The pot life of this mixture is about 1 hour and the curing time is about 1:5 hours at 120°C.

For comparison, the flask used in Example 1 is charged with 600 parts by weight of the novolak phenolic resin described in Example 1. The resin is melted, heated to 100°C, and then mixed with 2,640 parts by weight of epichlorohydrin and 430 parts by weight of a 50 percent aqueous sodium hydroxide solution. The times and temperatures indicated in Example 1 are used for the additions. Excess epichlorohydrin is distilled out of the reaction mixture under reduced pressure up to an internal temperature of 150°C. The residue is then mixed with 870 parts by weight of methyl isobutyl ketone and 380 parts by weight of water. The phases are then separated at 80°c. The organic phase is filtered, and the solvent is distilled out of the filtrate under reduced pressure. These steps are carried out under the conditions described in Example 1. 400 parts by weight of epoxy-novolak resin having the following properties are obtained:

| | |
|---|---|
| Melting point | 60 to 65°C |
| Epoxy equivalent weight | 350 |
| Viscosity | 450 cP |

The advantage of the epoxy-novolak resins of the invention resides in their low epoxy equivalent weight, expressed as grams resin per epoxy group. This means a high number of epoxy groups per molecule, which are available for cross-linking reactions. A further advantage of the resins is their low viscosity which facilitates coating.

EXAMPLE 3 a. For preparing a paint composition the epoxy-novolak resin obtained in accordance with Example 1 is used. A ball-mill is charged with 54 parts by weight of titanium dioxide (Kronos A S of Titan Ges., 0.5 parts by weight of magnesium silicate, 20 parts by weight of the epoxy-novolak resin of Example 1 and 5 parts by weight of a solvent mixture consisting of equal parts by weight of ethylene glycol monomethyl ether, diacetone alcohol, ethylene glycol monobutyl ether and methyl ethyl ketone. The epoxy-novolak resin is used as a 60 wt.% solution in methyl isobutyl ketone. After thorough milling in the ball-mill until the pigment is completely dispersed, 20 parts by weight of the epoxy-novolak resin as a solution in methyl isobutyl ketone are added to the mixture and homogenized. The homogenization is continued in the ball-mill after further addition of 60 parts by weight of the epoxy-novolak resin in the same solvent, 1.5 parts by weight of a butylated amine resin (SIRAMIN 6,150 of Societa Italiana Resine S.I.R. S.p.A.) as a 60 wt.% solution in methyl isobutyl ketone and 1 part by weight of a surface active agent (Bayer A of Bayer AG) in a 1 wt.% toluene solution.

To the thus obtained homogeneous mixture 35 parts by weight of an epoxy-amine-adduct (EPOMIN 7,052 of Societa Italiana Resine S.I.R. S.p.A.) as a 50 wt.% solution in methyl isobutyl ketone are added. The viscosity of the mixture is adjusted to 100 seconds, measured at 25°C in a Ford cup No. 4, by adding 22 parts by weight of a solvent mixture consisting of equal parts by weight of ethylene glycol monomethyl ether, diacetone alcohol, ethylene glycol monobutyl ether and methyl ethyl ketone.

After homogenization the paint obtained is applied in a thickness of 250 microns on a glass-plate by means of a coating knife. The hardness of the film obtained is measured by means of an Albert-König pendulum. The following results are obtained:

| Time | Hardness of the film |
|---|---|
| after 24 hours | 37 seconds |
| after 4 days | 66 seconds |
| after 7 days | 96 seconds |
| after 15 days | 98 seconds | b. The process described in (a) is repeated, however using 63 parts by weight instead of 54 parts by weight of titanium dioxide. The curing of the paint is effected in the presence of a reactive polyamide resin (SIRAMID 8421 of Societa Italiana Resine S.I.R. S.p.A.) instead of SIRAMIN 6,150, which is added in an amount of 30 parts by weight. The hardness is measured as described in (a). The following results are obtained:

| Time | Hardness of the film |
|---|---|
| after 24 hours | 35 seconds |
| after 4 days | 41 seconds |
| after 7 days | 89 seconds |
| after 15 days | 108 seconds | c. The paints obtained in accordance with (a) and (b) are sprayed in a thickness of 250 microns on sandblasted metal sheets. The coated metal sheets are allowed to dry and cure for 15 days at ambient temperature. Thereafter, they are dipped into acidic or basic or salt solutions or into organic solvents and allowed to remain therein for 3 months. After 3 months they are taken off. Their properties are evaluated according to the following scale:

0 = not affected
1 = veil formation
2 = opacity
3 = surface affected
4 = softening
5 = highly affected
6 = destroyed The following results are obtained:

|  | paint of | |
|---|---|---|
|  | (a) | (b) |
| 36 % aqueous hydrochloric acid | 3 | 3 |
| 70 % aqueous sulphuric acid | 2 | 3 |
| 20 % aqueous nitric acid | 3 | 4 |
| 85 % aqueuous phosphoric acid | 3 | 3 |
| sea-water | 0 | 0 |
| 13 % sodium hypochlorite | 2 | 2 |
| 50 % aqueous sodium hydroxide | 0 | 0 |
| xylene | 0 | 0 |
| methyl ethyl ketone | 1 | 1 |
| 10 % aqueous acetic acid | 3 | 3 | d. The samples obtained in accordance with (c) are tested according to standard ASTM D-714 and blistering is determined. The following results are obtained:

paint obtained in accordance with (a) with 20% nitric acid = 8D
paint obtained in accordance with (a) with 10% acetic acid = 4F
paint obtained in accordance with (b) with 20% nitric acid = 4D
paint obtained in accordance with (b) with 10% acetic acid = 2M

What we claim is:

1. A process for the production of a solid epoxy-novolak resin which comprises
   a. adding to a fused novolak phenolic resin having an average molecular weight of about 500 to 650 and containing about 5 to 6 phenolic hydroxyl groups per molecule at about 80° to 100°C sodium hydroxide in a quantity of about 2 to 10 wt.% of the total quantity of the sodium hydroxide to be used, the total quantity of sodium hydroxide to be used corresponding to about 0.9 to 1.1 equivalents of sodium hydroxide per mole equivalent of phenolic hydroxyl groups of the novolak phenolic resin,
   b. adding to the reaction mixture obtained in accordance with
      a. in the course of at least about 2 hours at temperatures of about 80° to 100°C an epihalohydrine in a quantity of about 3 to 6 moles per mole equivalent of phenolic hydroxyl group of the novolak phenolic resin,
   c. adding to the reaction mixture obtained in accordance with (b) in the course of at least about 3 hours at temperatures of about 85° to 110°C the remainder of the sodium hydroxide and
   d. separating from the reaction mixture obtained in accordance with (c) the solid epoxy-novolak resin.

2. A solid epoxy-novolak resin obtained by
   a. adding to a fused novolak phenolic resin having an average molecular weight of about 500 to 650 and containing about 5 to 6 phenolic hydroxyl groups per molecule at about 80° to 100°C sodium hydroxide in a quantity of about 2 to 10 wt.% of the total quantity of the sodium hydroxide to be used, the total quantity of sodium hydroxide to be used corresponding to about 0.9 to 1.1 equivalents of sodium hydroxide per mole equivalent of phenolic hydroxyl groups of the novolak phenolic resin,
   b. adding to the reaction mixture obtained in accordance with (a) in the course of at least about 2 hours at temperatures of about 80° to 100°C an epihalohydrine in a quantity of about 3 to 6 moles per mole equivalent of phenolic hydroxyl groups of the novolak phenolic resin,
   c. adding to the reaction mixture obtained in accordance with (b) in the course of at least about 3 hours at temperatures of about 85° to 110°C the remainder of the sodium hydroxide and
   d. separating from the reaction mixture obtained in accordance with (c) the solid epoxy-novolak resin.

3. A process for the production of a solid epoxy-novolak resin which comprises
   a. adding to a fused novolak phenolic resin having an average molecular weight of about 500 to 650 and containing about 5 to 6 phenolic hydroxyl groups per molecule at about 80° to 100°C sodium hydroxide in a quantity of from about 3 to 6 wt.% of the total quantity of the sodium hydroxide to be used, the total quantity of sodium hydroxide to be used corresponding to about 0.9 to 1.1 equivalents of sodium hydroxide per mole equivalent of phenolic hydroxyl groups of the novolak phenolic resin,
   b. adding to the reaction mixture obtained in accordance with (a) in the course of at least about 2 hours at temperatures of about 80° to 100°C an epihalohydrine in a quantity of about 3 to 6 moles per mole equivalent of phenolic hydroxyl groups of the novolak phenolic resin,
   c. adding to the reaction mixture obtained in accordance with (b) in the course of at least about 3 hours at temperatures of about 85° to 110°C the remainder of the sodium hydroxide and
   d. separating from the reaction mixture obtained in accordance with (c) the solid epoxy-novolak resin.

4. A solid epoxy-novolak resin obtained by
   a. adding to a fused novolak phenolic resin having an average molecular weight of about 500 to 650 and containing about 5 to 6 phenolic hydroxyl groups per molecule at about 80° to 100°C sodium hydroxide in a quantity of about 3 to 6 wt.% of the total quantity of the sodium hydroxide to be used, the total quantity of sodium hydroxide to be used corresponding to about 0.9 to 1.1 equivalents of sodium hydroxide per mole equivalent of phenolic hydroxyl groups of the novolak phenolic resin,
   b. adding to the reaction mixture obtained in accordance with (a) in the course of at least about 2 hours at temperatures of about 80° to 100°C an epihalohydrine in a quantity of about 3 to 6 moles per mole equivalent of phenolic hydroxyl groups of the novolak phenolic resin,
   c. adding to the reaction mixture obtained in accordance with (b) in the course of at least about 3 hours at temperatures of about 85° to 110°C the remainder of the sodium hydroxide and
   d. separating from the reaction mixture obtained in accordance with (c) the solid epoxy-novolak resin.

5. A process for the production of a solid epoxy-novolak resin which comprises
   a. adding to a fused novolak phenolic resin having an average molecular weight of about 500 to 650 and containing about 5 to 6 phenolic hydroxyl groups per molecule at about 80° to 100°C sodium hydroxide in a quantity of from about 3 to 6 wt.% of the total quantity of the sodium hydroxide to be used, the total quantity of sodium hydroxide to be used corresponding to about 0.9 to 1.1 equivalents of sodium hydroxide per mole equivalent of phenolic hydroxyl groups of the novolak phenolic resin,
   b. adding to the reaction mixture obtained in accordance with (a) in the course of at least about 2 hours at temperatures of about 80° to 100°C epichlorohydrine in a quantity of about 5 moles per mole equivalent of phenolic hydroxyl groups of the novolak phenolic resin,
   c. adding to the reaction mixture obtained in accordance with (b) in the course of at least about 3 hours at temperatures of about 85° to 110°C the remainder of the sodium hydroxide and d. separating from the reaction mixture obtained in accordance with (c) the solid epoxy-novolak resin.

6. A solid epoxy-novolak resin obtained by a. adding to a fused novolak phenolic resin having an average molecular weight of about 500 to 650 and containing about 5 to 6 phenolic hydroxyl groups per molecule at about 80° to 100°C sodium hydroxide in a quantity of from about 3 to 6 wt.% of the total quantity of the sodium hydroxide to be used, the total quantity of sodium hydroxide to be used corresponding to about 0.9 to 1.1 equivalents of sodium hydroxide per mole equivalent of phenolic hydroxyl groups of the novolak phenolic resin, b. adding to the reaction mixture obtained in accordance with (a) in the course of at least about 2 hours at temperatures of about 80° to 100°C epichlorohydrine in a quantity of about 5 moles per mole equivalent of phenolic hydroxyl groups of the novolak phenolic resin, c. adding to the reaction mixture obtained in accordance with (b) in the course of at least about 3 hours at temperatures of about 85° to 110°C the remainder of the sodium hydroxide and d. separating from the reaction mixture obtained in accordance with (c) the solid epoxy-novolak resin.

* * * * *